United States Patent Office 3,651,142
Patented Mar. 21, 1972

3,651,142
3-AMINO-2-(3,4-DIHALOPHENYL)
BICYCLO[2.2.2]OCTAN-2-OL
Jules Freedman, Milwaukee, Wis., assignor to Colgate-Palmolive Company, New York, N.Y.
No Drawing. Filed Feb. 6, 1969, Ser. No. 797,233
Int. Cl. C07c 91/00
U.S. Cl. 260—570.5 CA          7 Claims

ABSTRACT OF THE DISCLOSURE

The compounds are 3-amino-2-(3,4-disubstituted)bicyclo[2 2.2]octan-2-ols which are useful in the treatment of depression. Representative compounds disclosed in the application are N-methyl-2-(3,4-dichlorophenyl)-3-aminobicyclo[2.2.2]octan-2-ol hydrochloride, N-isopropyl-2-(3,4-dichlorophenyl)-3-aminobicyclo[2.2.2]octan - 2 - ol, and N,N-dimethyl - 2 - (3,4-dichlorophenyl)-3-aminobicyclo[2.2.2]octan-2-ol hydrochloride.

DESCRIPTION OF THE INVENTION

The compounds of the present invention may be represented by the following formula:

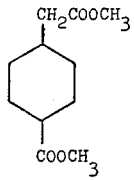

(I)

in which Y and Z are selected from a halogen such as bromine, chlorine or fluorine and trifluoromethyl, and $R_1$ and $R_2$ are selected from hydrogen and a lower alkyl of 1 to 4 carbon atoms such as methyl, ethyl, propyl and isopropyl; provided, however, that both $R_1$ and $R_2$ are not hydrogen.

The components of the present invention may be conveniently prepared from 4-carboxycyclohexaneacetic acid dimethyl ester which has the following formula

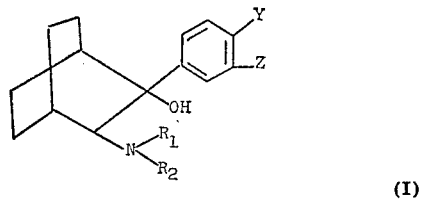

II

This compound is known to those skilled in the art and may be prepared as described in the literature or as illustrated in the example which is included hereafter.

In the preferred method of the invention the 4-carboxycyclohexaneacetic acid dimethyl ester is dissolved in dry toluene and is added dropwise to a refluxing suspension of sodium hydride in dry toluene. The mixture is refluxed for an extended period of time, up to and exceeding 20 hours, and then cooled and added cautiously to a mixture of concentrated hydrochloric acid and ice to form 3-oxabicyclo[2.2.2]octan-2-carboxylic acid methyl ester. The thus obtained methyl ester is added to an aqueous solution of sodium hydroxide and the resulting mixture treated with nitrous acid. The resulting precipitate is bicyclo[2.2.2]octan-2,3-dione monoxime. A solution of the monoxime in methanol is reduced at a pressure of 60 lbs. per square inch of hydrogen in the presence of 5% platinum on charcoal catalyst and an equivalent amount of concentrated hydrochloride acid to form the 3-amino-bicyclo[2.2.2]octanone hydrochloride. The thus formed 3-amino-bicyclo[2.2.2]octanone is then treated with a suitable Grignard reagent under normal Grignard reaction conditions to form the 3-amino-2-(3,4-disubstituted phenyl)bicyclo[2.2.2]octan-2-ol.

The 3-amino-2-(3,4-disubstituted phenyl)bicyclo[2.2.2]octan-2-ols may alternatively be prepared by treating the above described monoxime with a suitable Grignard reagent under normal Grignard reaction conditions to form the corresponding 3-(3,4-disubstituted phenyl)-3-hydroxybicyclo[2.2.2]octanone oxime and then treating that compound with lithium aluminum hydride under reducing conditions.

The above described processes may be illustrated as follows:

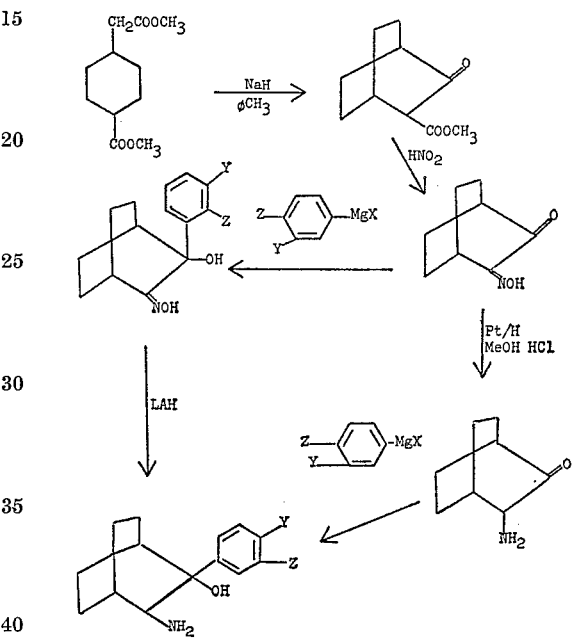

wherein Y and Z and R and $R_1$ are as previously described and do not partake in or interfere with the reactions.

Representative of the Grignard reagents which may be employed in the described process are the following:

3,4-dichlorophenylmagnesiumbromide, and
3,4-difluorophenylmagnesiumbromide.

Representative of the compounds which may be prepared by the described process are the following:

3-oxabicyclo[2.2.2]octane-2-carboxylic acid methyl ester,
bicyclo[2.2.2]octan-2,3-dione monoxime,
3-aminobicyclo[2.2.2]octanone hydrochloride,
3-amino-2-(3,4-dichlorophenyl)bicyclo[2.2.2]octan-2-ol, and
3-amino-2-(3,4-difluorophenyl)bicyclo[2.2.2]octan-2-ol.

Secondary and tertiary amines may be prepared from the above described unsubstituted amino compounds by conventional techniques. For example, the corresponding secondary amine, the methylamino compound may be prepared from the corresponding N-carbomethoxy-2-(3,4-disubstituted phenyl)-3-aminobicyclo[2.2.2]octan-2-ol by treating it with lithium aluminum hydride in anhydrous ether under reflux conditions.

The corresponding N-isopropyl derivative compound may be prepared by treating a 2 - (3,4 - disubstituted phenyl)-3-amino-bicyclo[2.2.2]octane-2-ol with acetone and ethanol under reflux to form a 2-(3,4-disubstituted phenyl) - 4,4 - dimethyl - 3,5 - oxazatricyclo[5.2.2.0$^{2,6}$] undecane. The thus obtained intermediate compound is then treated with lithium aluminum hydride in dry tetrahydrofuran or ether under reflux conditions to yield the desired N-isopropyl derivative.

The corresponding dimethyl derivative may be prepared by treating the selected amino alcohol with a mixture of 90% formic acid and 37% formaldehyde under reflux conditions to form the corresponding 2-(3,4-disubstituted phenyl) - 5-methyl-3,5-oxazatricyclo[5.2.2.0$^{2,6}$]undecane which upon treatment with lithium aluminum hydride yields the desired dimethyl derivative.

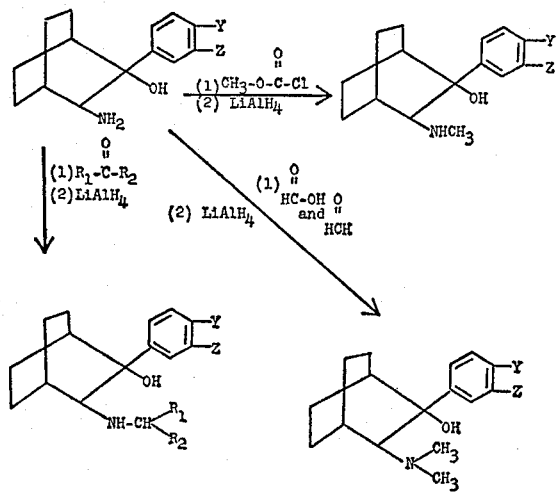

wherein the symbols Y, Z, R$_1$ and R$_2$ are as previously defined and do not interfere with or partake in the reaction.

Representative of the compounds which may be prepared by the described process are the following:

2-(3,4-dichlorophenyl)-4,4-dimethyl-3,5-oxazatricyclo[5.2.2.0$^{2,6}$]undecane,
N-isopropyl-2-(3,4-dichlorophenyl)-3-aminobicyclo-[2.2.2]octan-2-ol,
2-(3,4-dichlorophenyl)-5-methyl-3,5-oxazatricyclo[5.2.2.0$^{2,6}$]undecane hydrochloride,
N,N-dimethyl-2-(3,4-dichlorophenyl)-3-aminobicyclo[2.2.2]octan-2-ol hydrochloride,
N-carbomethoxy-2-(3,4-dichlorophenyl)-3-aminobicyclo-[2.2.2]octan-2-ol, and
N-methyl-2-(3,4-dichlorophenyl)-3-aminobicyclo[2.2.2]octan-2-ol.

The compounds of the present invention are basic in nature and form acid addition salts with inorganic and organic acids such as formic acid, citric acid, maleic acid, sulphuric acid, hydrochloric acid, tartaric acid or fumaric acid. The compounds also form quaternary ammonium salts when treated with suitable alkylating agents such as methyl chloride, ethyl iodide or methyl bromide.

The novel compounds of the present invention and their nontoxic acid addition salts are useful as pharmaceutical agents. The compounds N-methyl-2-(3,4-dichlorophenyl)-3-aminobicyclo[2.2.2]octan-2-ol and N-isopropyl-2-(3,4-dichlorophenyl) - 3 - aminobicyclo[2.2.2]octan-2-ol when administered to animals produce a central nervous system stimulation. In mice receiving 10 to 300 mg./kg. of the compounds intraperitoneally in the form of an aqueous suspension there was observed elevations of mood characteristics, of awareness and of motor coordination, which are characteristic of central nervous system stimulant activity. As a result of the tests the compounds were found to have intraperitoneal LD$_{50}$'s in excess of 50 mg./kg. in mice. The tests were conducted in accordance with the procedure set forth by Irwin in "Animal and Clinical Pharmacologic Techniques in Drug Evaluation," J. H. Nodine and P. E. Siegler, ed., Year Book Publishers, Inc., 1964, pp. 36–54.

The two previously named compounds also possess antidepressant properties. For example, they were found to exhibit a norepinephrine potentiating effect in a test employing the isolated vas deferens of the rat. In addition, the compounds in doses of 5 to 20 mg./kg. intraperitoneally were found to produce an antagonism of reserpine induced depression in the classic reserpine antagonism test. It is well accepted that compounds which both reverse reserpine depression and potentiate norepinephrine possess an antidepressant type activity.

When intended for pharmaceutical use the compounds are preferably utilized in the form of a nontoxic acid addition salt; however, the free base form of the compound may be employed. The active ingredient is usually combined with conventional pharmaceutical additives, such as diluents, flavoring agents, disintegrating agents and the like, and then formed into conventional pharmaceutical dosage forms such as tablets, capsules, suspensions for oral administrations, or sterile solutions for parenteral administration. Typical dosage forms will generally contain from 5 to 75 mg. of the active ingredient.

A typical tablet may have the following composition:

| | Mg. |
|---|---|
| N - isopropyl-2-(3,4-dichlorophenyl)-3-aminobicyclo[2.2.2]octan-2-ol | 20 |
| Lactose | 136.5 |
| Corn starch | 20 |
| Corn starch (as 10% starch paste) | 3.4 |
| Magnesium stearate | 1.3 |

The tablets are formed using a 5/16 inch diameter punch for compression.

Capsules may be prepare dby filling No. 3 hard gelatin capsules with the following ingredients:

| | Mg. |
|---|---|
| N-isopropyl-2-(3-,4-dichlorophenyl) - 3 - aminobicyclo[2.2.2]octan-2-ol | 20 |
| Lactose U.S.P. | 200 |
| Starch U.S.P. | 16 |
| Talc U.S.P. | 8 |

In clinical practice, the daily dosage of the active ingredient may range from 20 mg. to 250 mg. The exact amount to be administered will, of course, vary with the patient's size and the severity of his condition.

The compounds may also be employed to form other useful products. The thiocyanic acid addition salts of the compounds of this invention, when condensed with formaldehyde, form resinous materials useful as pickling agents according to U.S. Pats. 2,425,320 and 2,606,155. The compounds also form fluosilicic acid addition salts which are useful as wood preservatives and mothproofing agents according to U.S. Pats. 1,915,334 and 2,075,359.

The following examples illustrate the practice of the invention:

EXAMPLE 1

4-carboxycyclohexaneacetic acid dimethyl ester

A solution of disodium homoterephthalate (1 M) in 500 ml. of water is reduced at 1000 lbs. with the aid of 0.3% by weight of 5% rhodium-alumina. When uptake of hydrogen ceases, the catalyst is filtered, the filtrate acidified with concentrated hydrochloric acid and the solid which forms filtered and air dried. The diacid is dissolved in 500 ml. of methanol containing 5 ml. of concentrated sulfuric acid and the mixture refluxed for 22 hours. The methanol is removed at reduced pressure, the residue taken up in ether, and the ether solution washed with water, dilute bicarbonate solution and water, and dried over calcium chloride. Distillation yields 4-carboxycyclohexaneacetic acid dimethyl ester, B.P. 112–114°/1.3 mm.

Aanalysis.—Calcd. for C$_{11}$H$_{18}$O$_4$ (percent): C, 61.67; H, 8.47. Found (percent): C, 61.95; H, 8.70.

EXAMPLE 2

3-oxobicyclo[2.2.2]octane-2-carboxylic acid methyl ester

A solution of 642 g. (3 M) of 4-carboxycyclohexaneacetic acid dimethyl ester in 500 ml. of dry toluene is added dropwise over 3.75 hours to a stirred, refluxing suspension of sodium hydride (from 300 g. of 53% mixture in oil) in 6 liters of dry toluene. After refluxing 20 hours, the mixture is cooled and added cautiously to a mixture of 550 ml. of concentrated hydrochloric acid, 2.5 liters of water, and 2.5 kg. ice. Stirring is continued until the yellow color disappears. The layers are separated, the organic phase dried over calcium chloride, and fractionated to give 3-oxobicyclo[2.2.2]octane-2-carboxylic acid methyl ester, B.P. 121–122°/4.5 mm.

*Analysis.*—Calcd. for $C_{10}H_{14}O_3$ (percent): C, 65.95; H, 7.75. Found (percent): C, 65.84; H, 7.83.

EXAMPLE 3

Bicyclo[2.2.2]octan-2,3-dione monoxime

The keto-ester (254 g., 1.4 M) of Example 2 is added all at once to a stirred solution of 61.7 g. (1.54 M) of NaOH in 1.4 liters of distilled water. After stirring 1 hour, a solution of 100 g. (1.44 M) of sodium nitrite in 300 ml. of distilled water is added dropwise and the mixture stirred at room temperature for 18 hours. After cooling in ice, 500 ml. of 6 N HCl is added dropwise over 4 hours and the precipitate filtered and air dried. Recrystallization from carbon tetrachloride gives bicyclo[2.2.2]octan-2,3-dione monoxime, M.P. 131–134°.

*Analysis.*—Calcd. for $C_8H_{11}NO_2$ (percent): C, 62.72; H, 7.25; N, 9.15. Found (percent): C, 62.45; H, 7.42; N, 9.31.

EXAMPLE 4

3-aminobicyclo[2.2.2]octanone hydrochloride

A solution of 15.3 g. (0.1 M) of bicyclo[2.2.2]octan-2,3-dione monoxine in a mixture of 150 ml. of methanol and 10 ml. of concentrated HCl is reduced at 60 lbs. with the aid of 5% Pt/charcoal, when uptake ceases the catalyst is filtered, the methanol removed and the residue diluted with acetone to give 3-aminobicyclo[2.2.2]octanone hydrochloride, M.P. 172–175°, resolidifies 180°, decomposes 315°.

*Analysis.*—Calcd. for $C_8H_{14}ClNO$ (percent): C, 54.70; H, 8.05; N, 7.97; Cl, 20.19. Found (percent): C, 54.76; H, 7.85; N, 7.85; Cl, 19.95.

EXAMPLE 5

3-amino-2-(3,4-dichlorophenyl)bicyclo[2.2.2]octan-2-ol hydrochloride 3-aminobicyclo[2.2.2]octanone hydrochloride (14.0 g., 0.08 M) is added, in portions, to the Grignard reagent prepared from 90.4 g. (0.4 M) of 3,4-dichlorobromobenzene, 9.7 g. (0.4 M) of magnesium, and 400 ml. of ether. After stirring 21 hours at room temperature, the mixture is cooled in ice and treated with dilute aqueous ammonia. The ether is decanted and the residual emulsion extracted with several portions of ether. Shaking the organic phase with aqueous HCl gives 3-amino-2-(3,4-dichlorophenyl)bicyclo[2.2.2]octan-2-ol hydrochloride as a solid, M.P. 242–244°. Recrystallization from methanol-acetonitrile gives a sample that melts at 243.5–244.5°.

*Analysis.*—Calcd. for $C_{14}H_{18}Cl_3NO$ (percent): C, 52.12; H, 5.67; Cl, 32.96; N, 4.34. Found (percent): C, 52.25; H, 5.81; Cl, 32.92; N, 4.55.

EXAMPLE 6

3-amino-2-(3,4-dichlorophenyl)bicyclo[2.2.2]octan-2-ol

The base is liberated from the hydrochloride of Example 11 with 10% NaOH and recrystallized from ethanol to yield 3-amino-2-(3,4 - dichlorophenyl)bicyclo[2.2.2]octan-2-ol, M.P. 114–116°.

*Analysis.*—Calcd. for $C_{14}H_{17}Cl_2NO$ (percent): C, 58.75; H, 5.98; Cl, 24.78; N, 4.89. Found (percent): C, 59.00; H, 6.00; Cl, 24.60; N, 4.76.

EXAMPLE 7

N-carbomethoxy - 2 - (3,4 - dichlorophenyl)-3-aminobicyclo[2.2.2]octan-2-ol (A) and 2 - (3,4 - dichlorophenyl)-3,5-oxazatricyclo[5.2.2.0$^{2,6}$]-undecan - 4 - one (B)

A solution of 5.7 g. (0.02 M) of 2-(3,4-dichlorophenyl)-3-aminobicyclo[2.2.2]octan-2-ol in 50 ml. of dry benzene containing 3.0 ml. of triethylamine is treated dropwise with 2.08 g. (0.022 M) of freshly distilled (B.P. 70°) methyl chloroformate in 25 ml. of dry benzene. The addition is mildly exothermic. After 6 hours at room temperature, the mixture is extracted with 50 ml. of water, 50 ml. of 3 N HCl and 50 ml. of water. The aqueous extracts are washed with ether and these combined with the benzene. After drying with $CaCl_2$ the solvents are removed to give a solid, M.P. 141–143°. TLC (silica-ether) shows it to be a mixture of two substances. Chromatography on 200 g. of silica and elution with chloroform gives the urethane, M.P. 154–155°. Recrystallization from ethanol raised the M.P. to 154–156°.

(A) *Analysis.*—Calcd. for $C_{16}H_{19}Cl_2NO_3$ (percent): C, 55.82; H, 5.56; Cl, 20.59; N, 4.07. Found (percent): C, 55.58; H, 5.14; Cl, 21.00; N, 4.31.

Further elution gives a mixture and then the oxazolidinone, M.P. 174–185°. Recrystallization from a small amount of ethanol gives an M.P. of 196–198°.

(B) *Analysis.*—Calcd. for $C_{15}H_{15}Cl_2NO_2$ (percent): C, 57.73; H, 4.85; Cl, 22.72; N, 4.49. Found (percent): C, 57.74; H, 4.65; Cl, 22.70; N, 4.40.

EXAMPLE 8

N-methyl-2-(3,4-dichlorophenyl)-3-aminobicyclo[2.2.2]octan-2-ol hydrochloride The urethane, N-carbomethoxy-2-(3,4-dichlorophenyl)-3-aminobicyclo[2.2.2]octan-2-ol (2.06 g., 0.006 M) is added all at once to a mixture of 0.76 g. (0.02 M) of $LiAlH_4$ and 100 ml. of ether. After refluxing 24 hours, the mixture is cooled and treated with 2.0 ml. of water. After stirring for 0.5 hour, the solids are filtered and the filtrate treated with ethereal HCl to give a solid, M.P. 276–279°.

From 2.0 g. of a mixture of oxazolidinone and urethane a hydrochloride of M.P. 276–280° is obtained.

The combined hydrochlorides are recrystallized from 185 ml. of boiling water to give N-methyl-2-(3,4-dichlorophenyl)-3-aminobicyclo[2.2.2]octan - 2 - ol hydrochloride as a solid, M.P. 291–292°.

*Analysis.*—Calcd. for $C_{15}H_{20}Cl_3NO$ (percent): C, 57.23; H, 6.30; Cl, 10.56; N, 4.17. Found (percent): C, 57.32; H, 6.41; Cl, 11.10; N, 4.23.

EXAMPLE 9

2-(3,4-dichlorophenyl)-4,4-dimethyl-3,5-oxazatricyclo[5.2.2.0$^{2,6}$]undecane A mixture of 5.7 g. (0.02 M) of 2-(3,4-dichlorophenyl)-3-aminobicyclo[2.2.2]octan-2-ol, 10 ml. of acetone and 50 ml. of ethanol is refluxed for 5 hours and the solvents removed. Recrystallization of the residue from 50 ml. of petroleum ether gives 2 - (3,4 - dichlorophenyl)-4,4-dimethyl-3,5-oxazatricyclo[5.2.2.0$^{2,6}$]undecane as a solid, M.P. 120–122°.

*Analysis.*—Calcd. for $C_{17}H_{21}Cl_2NO$ (percent): C, 62.58; H, 6.49; Cl, 21.73; N, 4.30. Found (percent): C, 63.06; H, 6.30; Cl, 22.08; N, 4.24.

EXAMPLE 10

N-isopropyl-2-(3,4-dichlorophenyl)-3-aminobicyclo[2.2.2]octan-2-ol

A solution of 1.7 g. (0.0052 M) of 2-(3,4-dichlorophenyl)-4,4-dimethyl - 3,5 - oxazatricyclo[5.2.2.0$^{2,6}$]undecane in 25 ml. of dry THF is added dropwise to a stirred mixture of 0.5 g. of LiAlH$_4$ in 25 ml. of dry THF. After refluxing 4 hours, the mixture is cooled, treated with 1.0 ml. of water and stirring continued for 2 hours. The solids are filtered, the solvent removed and the solid residue dissolved in 25 ml. of hot petroleum ether to give N-isopropyl-2-(3,4-dichlorophenyl) - 3 - aminobicyclo[2.2.2]octan-2-ol as a solid, M.P. 133–136°.

Analysis.—Calcd. for $C_{17}H_{23}Cl_2NO$ (percent): C, 62.20; H, 7.06; Cl, 21.60; N, 4.27. Found (percent): C, 62.16; H, 7.12; Cl, 21.60; N, 4.10.

The maleate, prepared in ether, melts at 197–199° after recrystallization from isopropanol.

Analysis.—Calcd. for $C_{21}H_{27}Cl_2NO_5$ (percent): C, 56.76; H, 6.13; N, 3.15. Found (percent): C, 56.94; H, 5.85; N, 3.13.

EXAMPLE 11

2-(3,4-dichlorophenyl)-5-methyl-3,5-oxazatricyclo-[5.2.2.0$^{2,6}$]undecane hydrochloride A mixture of 4.0 g. (0.014 M) of 2 - (3,4 - dichlorophenyl)-3-aminobicyclo[2.2.2]octan-2-ol, 20 ml. of 90% formic acid and 10 ml. of 37% formaldehyde is refluxed for 24 hours. Addition of 30 ml. of 6 N HCl to the cooled solution gives a solid, M.P. 263–264°. Recrystallization from 50 ml. of 1:1 ethanol-water gives 2-(3,4-dichlorophenyl) - 5 - methyl-3,5-oxazatricyclo[5.2.2.0$^{2,6}$]undecane hydrochloride.

Analysis.—Calcd. for $C_{16}H_{20}Cl_3NO$ (percent): C, 55.11; H, 5.78; Cl, 30.42; N, 4.02. Found (percent): C, 55.23; H, 5.87; Cl, 30.30; N, 3.77.

EXAMPLE 12

N,N-dimethyl-2-(3,4-dichlorophenyl)-3-aminobicyclo-[2.2.2]octan-2-ol hydrochloride 2-(3,4-dichlorophenyl)-5-methyl - 3,5 - oxazatricyclo-[5.2.2.0$^{2,6}$]undecane hydrochloride, 2.2 g., is treated with 10% NaOH and the base extracted into CHCl$_3$. After drying over CaCl$_2$ the solvent is removed and the residue, in 50 ml. of dry (CaH$_2$) ether, added to 0.5 g. LAH in 50 ml. of ether. After refluxing 5.5 hours, and stirring overnight, the mixture is cooled and treated with 1.5 ml. of H$_2$O. After 1 hour, the solids are filtered, rinsed well with ether and the filtrates treated with ether-HCl to give an oil which solidified on trituration with CH$_3$CN. The solid, N,N-dimethyl-2-(3,4-dichlorophenyl) - 3 - aminobicyclo-[2.2.2]octan-2-ol hydrochloride, M.P. 295–296°, recrystallized from MeOH-CH$_3$CN to a purified sample which melts at 300–301°.

Analysis.—Calcd. for $C_{16}H_{22}Cl_3NO$ (percent): C, 54.78; H, 6.32; N, 3.99. Found (percent): C, 55.29; H, 6.20; N, 4.51.

EXAMPLE 13

3-(3,4-dichlorophenyl)-3-hydroxybicyclo[2.2.2] octanone oxime

To the Grignard reagent prepared from 100 g. (0.44 mole) of 3,4-dichlorobromobenzene, 10.8 g. (0.44 mole) of magnesium and 400 ml. of dry ether (initiated with 0.5 ml. of dibromoethane) is added 30.6 g. (0.2 mole) of bicyclo[2.2.2]octan-2,3-dione monoxime in 100 ml. of dry benzene and the mixture refluxed for 6 hours. The reaction mixture is decomposed with dilute HCl, the organic layer separated and the aqueous phase extracted with ether. The combined organic layers are dried over CaCl$_2$, the solvents removed and the residue boiled with cyclohexane. The solids are filtered to yield 3-(3,4-dichlorophenyl)-3-hydroxybicyclo[2.2.2]octanone oxime, M.P. 180–182.5°. Recrystallization from ethanol raises an M.P. of 180.5–182.5°.

Analysis.—Calcd. for $C_{14}H_{13}ClNO_2$ (percent): C, 56.01; H, 5.04; Cl, 23.63; N, 4.67. Found (percent): C, 55.96; H, 5.24; Cl, 23.61; N, 4.65.

EXAMPLE 14

2-(3,4-dichlorophenyl)-3-aminobicyclo[2.2.2]octan-2-ol 3-(3,4 - dichlorophenyl) - 3 - hydroxybicyclo[2.2.2]-octanone oxime (18.0 g., 0.06 mole) is added in portions to 6.85 g. (0.18 mole) of LAH in 400 ml. of dry (CaH$_2$) ether. The mixture is refluxed for 5 hours, stirred at room temperature overnight, cooled in ice and decomposed with 25 ml. of ethyl acetate followed by 15 ml. of water. After stirring 1 hour, the solids are filtered and washed well with ether. Shaking the ether solution with 1:9 HCl-H$_2$O gives 2 - (3,4 - dichlorophenyl) - 3 - aminobicyclo[2.2.2]-octan-2-ol as the hydrochloride, M.P. 242–243° C.

I claim:
1. A compound selected from compounds of the formula

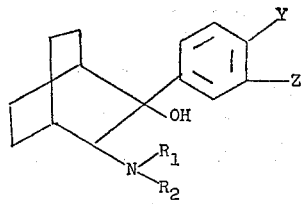

and nontoxic addition salts thereof wherein Y and Z are halogen and R$_1$ and R$_2$ are selected from hydrogen and lower alkyl; provided, however, that both R$_1$ and R$_2$ are not hydrogen.

2. A compound of claim 1 in which Y and Z are chlorine.

3. A compound of claim 1 in which Y and Z are chlorine and R$_1$ and R$_2$ are selected from methyl and isopropyl.

4. A compound of claim 1 in which Y and Z are chlorine, R$_1$ is hydrogen and R$_2$ is methyl.

5. A compound of claim 1 in which Y and Z are chlorine and R$_1$ and R$_2$ are methyl.

6. A compound of claim 1 in which Y and Z are chloro and R$_1$ is hydrogen and R$_2$ is methyl or isopropyl.

7. N - isopropyl - 2 - (3,4 - dichlorophenyl) - 3 - aminobicyclo[2.2.2]octan-2-ol.

References Cited

UNITED STATES PATENTS 3,148,118   9/1964   Thesing et al. ____ 260—570.5 X

ROBERT V. HINES, Primary Examiner

U.S. Cl. X.R.

260—307 R, 468 B, R, 471 R, 501.17, 563 P, 566 A, 567.6 M; 424—329, 330